(12) United States Patent
Gold et al.

(10) Patent No.: US 9,086,820 B2
(45) Date of Patent: Jul. 21, 2015

(54) SYSTEM AND METHODS FOR MANAGING STORAGE SPACE ALLOCATION

(71) Applicant: INFINIDAT LTD., Hertzelia (IL)

(72) Inventors: Israel Gold, Haifa (IL); Julian Satran, Omer (IL)

(73) Assignee: INFINIDAT LTD., Hertzelia (IL)

( * ) Notice: Subject to any disclaimer, the term of this patent is extended or adjusted under 35 U.S.C. 154(b) by 313 days.

(21) Appl. No.: 13/709,092

(22) Filed: Dec. 10, 2012

(65) Prior Publication Data

US 2014/0164730 A1   Jun. 12, 2014

(51) Int. Cl.
*G06F 12/00* (2006.01)
*G06F 3/06* (2006.01)
*G06F 12/10* (2006.01)

(52) U.S. Cl.
CPC ............ *G06F 3/0683* (2013.01); *G06F 3/064* (2013.01); *G06F 3/0608* (2013.01); *G06F 12/1036* (2013.01)

(58) Field of Classification Search
None
See application file for complete search history.

(56) References Cited

U.S. PATENT DOCUMENTS

| 2011/0202722 A1* | 8/2011 | Satran et al. | 711/114 |
| 2014/0019706 A1* | 1/2014 | Kanfi | 711/171 |

* cited by examiner

*Primary Examiner* — Brian Peugh
(74) *Attorney, Agent, or Firm* — Oren Reches

(57) ABSTRACT

A request for obtaining a space allocation descriptor is received by a block control layer of a storage system. The space allocation descriptor is indicative of one or more logical blocks free for allocation within a range of logical addresses. The range of logical addresses is included within a logical address space related to an upper layer application which has issued the request. The space allocation descriptor is provided by using a data structure included in the block control layer and operative to map between the logical address space and allocated storage blocks within a physical storage space, managed by the block control layer.

19 Claims, 6 Drawing Sheets

--- receiving, from an upper layer application, a request for obtaining a space allocation descriptor for mapping free blocks within a range of logical addresses included in a logical address space
310 providing the space allocation descriptor by using a data structure operative to map between the logical address space and allocated storage blocks within the physical storage space
320 identifying in the data structure all entries indicative of mapping at least one logical address within the range of logical addresses
321 obtaining an entry allocation descriptor indicative of allocation status of all logical blocks corresponding to the identified entry
323 generating the space allocation descriptor using the entry allocation descriptors of the identified entries
325

300 receiving, from an upper layer application, a request for obtaining a space allocation descriptor for mapping free blocks within a range of logical addresses included in a logical address space
310 providing the space allocation descriptor by using a data structure operative to map between the logical address space and allocated storage blocks within the physical storage space
320 identifying in the data structure all entries indicative of mapping at least one logical address within the range of logical addresses
321 obtaining an entry allocation descriptor indicative of allocation status of all logical blocks corresponding to the identified entry
323 generating the space allocation descriptor using the entry allocation descriptors of the identified entries
325

300

FIG. 3 configuring a mapping data structure to include a plurality of entries, each entry indicative of a mapping between logical blocks and respective allocated storage blocks
410 associating at least one entry with an allocation value, indicative of an identical allocation status shared by all logical blocks of the entry
420 configuring the data structure to include one or more bitmaps each associated with a respective entry representing logical blocks having different allocation statuses, the bitmap is indicative of allocation statuses of all the logical blocks in the respective entry
430

FIG. 4

```
┌─────────────────────────────────────────────────────────────────────────────┐
│   receiving an allocation request for allocating one or more free storage blocks and for   │
│   associating the free storage blocks with a second range of logical addresses, included   │
│                         within the logical address space                                   │
│                                         510                                                │
└─────────────────────────────────────────────────────────────────────────────┘
                                          │
┌─────────────────────────────────────────────────────────────────────────────┐
│                           allocating the free storage blocks                               │
│                                         520                                                │
└─────────────────────────────────────────────────────────────────────────────┘
                                          │
┌─────────────────────────────────────────────────────────────────────────────┐
│  updating the data structure so as to include a mapping between the second range of logical │
│              addresses and the free storage blocks that have been allocated                │
│                                         530                                                │
└─────────────────────────────────────────────────────────────────────────────┘
```

FIG. 5 upon a de-allocation request related to all logical addresses in an entry, setting the
allocation value associated with the entry to indicate a free state of the entire entry
610 upon a de-allocation request related to a part of logical addresses in a certain entry,
associating the certain entry with a bitmap and using the bitmap to indicate the allocation
status each of the logical addresses is the certain entry
620

SYSTEM AND METHODS FOR MANAGING STORAGE SPACE ALLOCATION

TECHNICAL FIELD

The presently disclosed subject matter relates to managing storage space allocation and, more particularly, to managing storage space allocation related to an upper layer storage application operating on top of a block layer storage system.

BACKGROUND

Free-space management of storage-based applications is required for reusing the space freed when objects are deleted, for new objects or for new data of existing objects. Low level volume management involves handling fixed size blocks that compose the volume, which makes space allocation easier to handle. However, free-space management becomes more complicated when the managed storage consists of variable sized objects as usually happens in upper layer storage applications, such as filesystems that manage variable sized files, databases that manage tables and indexes of various sizes and the like.

Free space is managed using various types of data-structures, some of which are described below.

A file system is required to keep track of allocated and free blocks within a logical volume that contains objects of the file system. The simplest solution often used is an allocation bitmap that represents allocated and free space, wherein each bit in the bitmap represents a block in the volume and indicates whether the specific block in a volume is allocated or free. When the file system needs to allocate additional blocks, it refers to the bitmap to identify which blocks are available. However, it is extremely inefficient to search through a bitmap to find large contiguous chunks of free space, particularly when large volumes are involved.

Bitmaps of the whole volume can become quite large for high capacity volumes and need to be saved in the disk and to be read to the cache memory upon allocation change and then be written back to the disk.

Extent lists are the most common alternative to bitmaps. Extent lists are data structures that organize free space into contiguous regions described by location in storage and length of available blocks. Extent lists are sometimes preferred for compression, representing free space using less memory and storage. However, they can grow to be larger than bitmaps, particularly when storage is heavily utilized by small allocations.

One of the problems of bitmaps is de-allocation of blocks. Space allocation algorithms can control the locality of allocations, by deciding which area of the volume is currently dedicated for allocation of new data, but there is no control over the locality of frees, as portions of a file that were allocated in different times can be spread all over the volume. As an example of a worst case, removing 4 GB of object data (a million 4K blocks) could require million bitmaps (of 4K bit each) to be read, modified, and written back again.

SUMMARY

In accordance with certain aspects of the currently presented subject matter, there is provided a method of operating a storage system including a block control layer operatively coupled to one or more physical storage devices constituting a physical storage space represented by storage blocks, the method includes: (i) receiving a request for obtaining a space allocation descriptor indicative of one or more logical blocks free for allocation within a range of logical addresses, the range is included within a logical address space associated with an upper layer application which has issued the request; and (ii) providing the space allocation descriptor by using a data structure included in the block control layer and operative to map between the logical address space and allocated storage blocks within the physical storage space, managed by the block control layer.

In accordance with further aspects of the currently presented subject matter, the method can further include receiving an allocation request for allocating one or more free storage blocks and for associating the free storage blocks with a second range of logical addresses, included within the logical address space; allocating the free storage blocks; and updating the data structure so as to include a mapping between the second range of logical addresses and the free storage blocks that have been allocated.

The allocating the free storage blocks is provided merely in a case when the allocation request is related to writing data corresponding to the second range of logical addresses, to the physical storage space.

In accordance with further aspects of the currently presented subject matter, the method can further include configuring the data structure to include a plurality of entries, each entry indicative of mapping between logical blocks included in the logical address space and respective allocated storage blocks, and wherein each entry corresponds to a range of consecutive logical block addresses.

In accordance with further aspects of the currently presented subject matter, the method can further include associating at least one entry with an allocation value, wherein the at least one entry is characterized by an identical allocation status of all logical blocks corresponding to the at least one entry and wherein the allocation value indicative of the identical allocation status shared by all the logical blocks of the at least one entry.

In accordance with further aspects of the currently presented subject matter, the method can further include configuring the data structure to include one or more bitmaps each associated with a respective entry representing logical blocks having different allocation statuses, the bitmap is indicative of the allocation statuses of all logical blocks represented by the respective entry.

In accordance with further aspects of the currently presented subject matter, the method can further include, responsive to a de-allocation request related to all logical blocks represented by the at least one entry, setting the allocation value associated with the entry to indicate a free status of the entire entry.

In accordance with further aspects of the currently presented subject matter, the method can further include, responsive to a de-allocation request related to a part of logical blocks in a certain entry, associating the certain entry with a bitmap and using the bitmap to indicate an allocation status of each logical block represented by the certain entry.

In accordance with further aspects of the currently presented subject matter, the method can further include: responsive to the request for receiving the space allocation descriptor, identifying in the data structure all entries indicative of mapping at least one logical address within the range of logical addresses; for each identified entry, generating an entry allocation descriptor indicative of an allocation status of all logical blocks corresponding to the entry; wherein if a certain identified entry is characterized by an identical allocation status of all logical blocks corresponding to the entry, the entry allocation descriptor is configured to include data indicative of the range of the at least one logical address and an allocation value indicative of an allocation status of the entire entry; and wherein if the certain identified entry represents logical blocks having different allocation statuses, the entry allocation descriptor is configured to include a bitmap associated with the certain identified entry; and generating the space allocation descriptor using the entry allocation descriptors of the identified entries.

The logical blocks represented by each entry can be organized in one or more allocation units of a predefined size, and wherein the allocation units are the smallest data portions handled by the block control layer and by the data structure.

The data structure can be handled in a cache memory included in the block control layer and the step of providing includes accessing the data structure in the cache memory.

In accordance with other aspects of the currently presented subject matter, there is provided a non-transitory computer readable storage medium, that stores program instructions for: (i) receiving a request for obtaining a space allocation descriptor indicative of one or more logical blocks free for allocation within a range of logical addresses, the range included within a logical address space related to an upper layer application which has issued the request; and (ii) providing the space allocation descriptor by using a data structure included in the block control layer and operative to map between the logical address space and allocated storage blocks within the physical storage space, managed by the block control layer.

In accordance with other aspects of the currently presented subject matter, there is provided a storage system including a block control layer operatively coupled to one or more physical storage devices constituting a physical storage space represented by storage blocks; wherein the block control layer is configured to: (i) receive, from an upper layer application, a request for obtaining a space allocation descriptor indicative of one or more logical blocks free for allocation within a range of logical addresses, the range included within a logical address space related to the at least one upper layer application; and (ii) provide the space allocation descriptor by using a data structure included in the block control layer and operative to map between the logical address space and allocated storage blocks within the physical storage space, managed by the block control layer.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 3 is a flowchart illustrating a method for providing volume mapping services by a block based storage system to an upper layer application, according to embodiments of the presently disclosed subject matter;

FIG. 4 is a flowchart illustrating method steps for configuring a mapping data structure, according to embodiments of the presently disclosed subject matter;

FIG. 5 is a flowchart illustrating method steps for performing mapping, according to embodiments of the presently disclosed subject matter; and FIG. 6 is a flowchart illustrating method steps for performing unmapping, according to embodiments of the presently disclosed subject matter.

DETAILED DESCRIPTION

In the following detailed description, numerous specific details are set forth in order to provide a thorough understanding of the disclosed subject matter. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "providing", "allocating", "mapping", "updating", "writing", "configuring", "associating", "identifying", "obtaining", "generating" or the like, refer to the action and/or processes of a computer that manipulate and/or transform data into other data, said data represented as physical quantities, e.g. such as electronic quantities, and/or said data representing the physical objects. The term "computer" as used herein should be expansively construed to cover any kind of electronic device with data processing capabilities.

The operations in accordance with the teachings herein can be performed by a computer specially constructed for the desired purposes or by a general-purpose computer specially configured for the desired purpose by a computer program stored in a computer readable storage medium.

Figure 1:
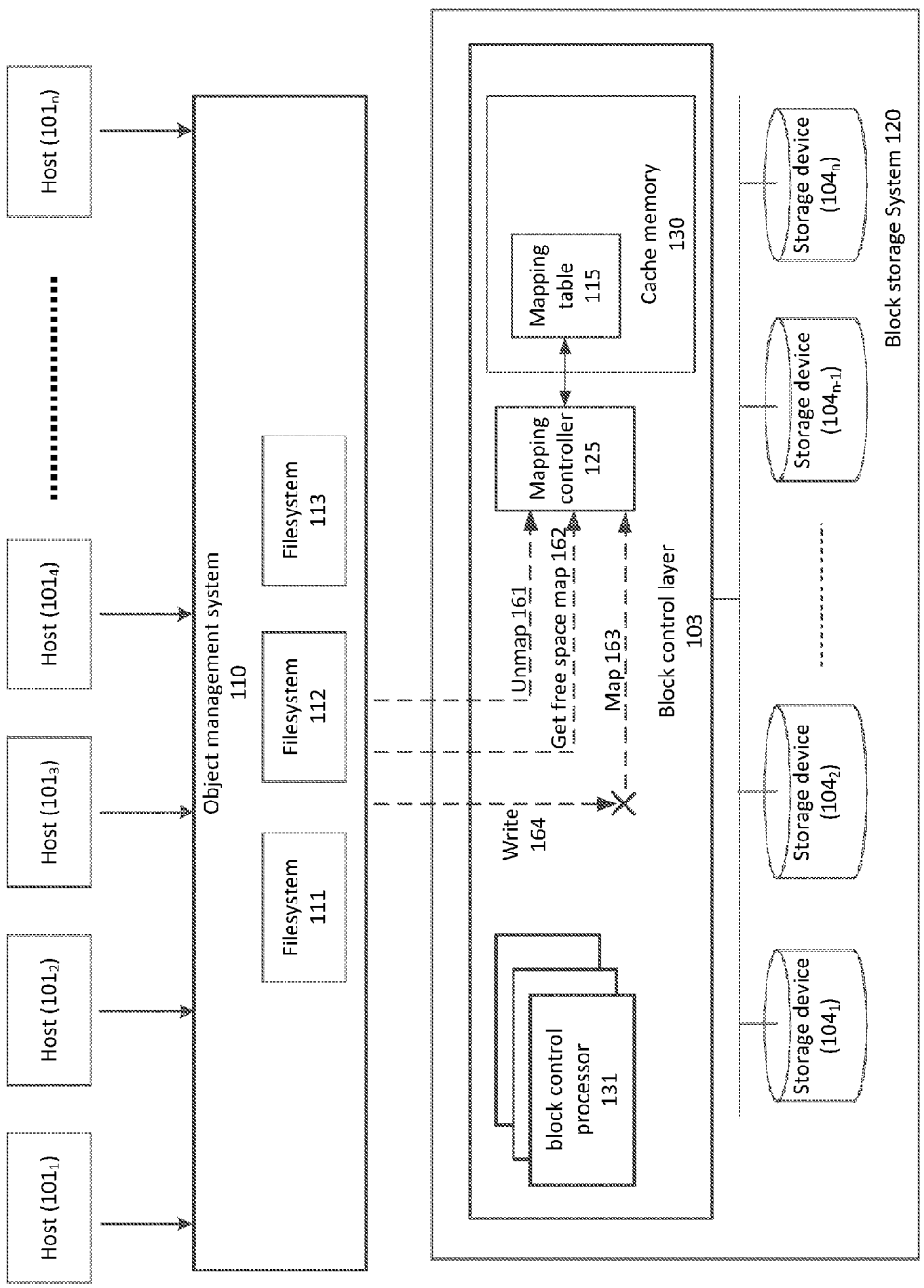
FIG. 1 is a functional block diagram schematically illustrating an embodiment of a block based storage system for providing space mapping services for upper layer applications, according to embodiments of the presently disclosed subject matter.

FIG. 1 illustrates an object management system 110 that operates on top of a block storage system 120. Object management system 110 includes upper layer applications, such as: one or more filesystems 111, 112, 113, one or more object stores (not shown), a database application (not shown) or any other upper layer application that needs storage resources and enables external applications running on other machines, such as hosts $101_{1-n}$, to access logical objects, e.g. files, database tables, database indexes, etc., whose data and optionally metadata are stored in storage devices $104_{1-n}$. For the sake of simplicity of explanation, in the following description, a filesystem is used as a non-limiting example of an upper layer application that is included in object management system 110 and a file is used as a non-limiting example of a logical object that is managed by the upper layer application.

Block storage system 120 manages a block based storage that includes a block control layer 103 and one or more storage devices $104_{1-n}$. Block control layer 103 is coupled to a plurality of data storage devices $104_{1-n}$ constituting a physical storage space. Block control layer 103 includes one or more processors, such as block control processors 131 for controlling storage devices 104 and I/O operations directed to the physical storage space. Block control layer 103 can include a cluster of multiple servers for controlling the I/O operations. Block control layer 103 can be operable to handle a virtual representation of the physical storage space and to facilitate mapping between the physical storage space and its virtual representation. In such cases, block control layer 103 can be configured to create and manage at least one virtualization layer interfacing between object management system 110 (or other external applications and hosts) and the physical storage space. The virtualization functions may be provided in hardware, software, firmware or any suitable combination thereof.

The physical storage space may comprise any appropriate permanent storage medium and may include one or more disk units (DUs), also called "disk enclosures", including several disk drives (disks). The physical storage space further includes a plurality of physical data blocks, each physical data block may be characterized by a pair ($DD_{id}$, DBA) where $DD_{id}$ is a serial number associated with the disk drive accommodating the physical data block, and DBA is a block number within the respective disk.

The entire address space of the storage system is divided into logical volumes, and each logical volume becomes an addressable device. A logical volume (LV) or logical unit (LU) represents a plurality of logical data blocks characterized by successive Logical Block Addresses (LBA). Different logical volumes may comprise different numbers of logical data blocks, which are typically of equal size within a given system (e.g. 512 bytes).

A logical volume that is created by storage system 120 is used by object management system 110 for hosting objects of e.g. a filesystem. The content of such a logical volume is managed by the file system and may include items such as: an inode table, super block, directories, files etc., wherein the filesystem is aware and in control of the location, in terms of LBAs, of each content item, within the logical volume. The physical blocks allocation and the virtualization of the logical volume is handled by storage system 120, including mapping LBAs within the logical volume into allocated physical block addresses, defined for example by disk drives serial number and DBAs within the physical storage space. Though the filesystem instructs storage system 120 which LBAs should be allocated and mapped into physical blocks, it is the responsibility of storage system 120 for managing the free space mapping within the logical volume.

The term 'logical address space' hereinafter describes a logical address range that is reserved for use by an upper layer application. The logical address space may relate to the address range covered by a logical volume reserved for the upper layer application, but this is not necessarily so and the term can be used to describe any address range reserved for the upper layer application, for example: a logical partition, a sub-volume, a group of logical volumes or just a mere address range. In the following examples, the term logical volume is used as an example of a logical address space that is assigned to an upper layer application.

Block storage system 120 implements a data-structure for mapping the logical address space of each logical volume managed by the storage system, into physical addresses in the physical storage space. The logical address space of a volume, which can be addressed by an upper layer application, can be substantially larger than the total physical memory that is currently allocated for the volume and can also be larger than the upper limit of physical memory amount that can be allocated for the volume. The logical address space is preferably assigned for the logical volume upon creation of the logical volume. However, actual physical address blocks are allocated and associated with respective LBAs within the logical address space of the volume, only upon actual writing of object's data to the volume. Thus, in the mapping data structure, LBA ranges within the logical address space that have not yet been assigned to ranges in the physical storage space, refer to null values instead of referring to associated physical addresses, or do not appear in the mapping data structure at all. Only LBA ranges that were written to are associated with references to allocated physical address ranges.

The virtualization of storage may include more than one virtualization layer, for example, the storage system can use two virtualization layers: (i) an upper virtualization layer may be the address space presented to applications, for example, the upper virtualization layer may be the logical address space of a logical volume, which contains the LBAs known to the upper layer application that uses the volume, for e.g. implementing a filesystem. Alternatively, the upper virtualization layer may be an internal virtual address space that is used by upper layer processes within block storage system 120; and (ii) a lower virtualization layer may be the physical addresses defined in terms of the pair ($DD_{id}$, DBA), but may also be a virtual physical address space, which is the actual available memory, represented differently from the pair ($DD_{id}$, DBA). For example: the virtual physical address space may be represented as a raw memory starting at address zero up to the maximum available physical space.

The mapping data structure can include mapping from any kind of upper layer addresses (also referred to hereinafter as 'logical addresses' or 'logical blocks') to any kind of lower layer addresses (also referred to hereinafter as 'physical addresses' or 'physical blocks').

The mapping data-structure is managed by storage system 120. FIG. 1 illustrates control layer 103 as including a mapping data-structure 115 and a mapping controller 125 that is configured to access mapping data-structure 115.

Block control layer 103 further includes a cache memory 130 for temporarily accommodating data to be destaged to the physical storage space and also for accommodating mapping data structure 115.

According to embodiments of the present disclosed subject matter, object management system 110 profits volume management services and particularly, free space mapping services provided by the underlying layer, i.e. storage system 120, that utilizes mapping data-structure 115 for providing these services, in addition to using mapping data-structure 115 for mapping logical addresses into physical addresses. The volume mapping services provided by storage system 120 to object management system 110 includes: (i) a mapping service; (ii) unmapping service; and (iii) get-free-space-mapping service.

The mapping service is triggered by a write request 164 that includes at least: object data to be written and a logical address range (which may be expressed as logical start address and size) in a logical volume. When the write operation is performed (e.g. when the cached object data is destaged to the physical storage) and the physical address range to be used for the writing is determined, an internal map request 163 is issued (e.g. by a data destaging module (not shown) of control layer 103) and handled by mapping controller 125. A mapping operation is for associating the physical address range, where the data requested to be written is actually stored or going to be stored, with the logical address range requested, by object management system 110, to be written to. The mapping is initiated by block control layer 103 when an object write request arrives from object management system 110, thus map-request 163 is an implicit request that is activated when the filesystem is writing object's data to the physical storage space.

The unmapping service is activated by object management system 110 using unmap request 161 for freeing a specified range of LBAs. The freeing of LBAs includes, at least, removing an association of a physical address range with the specified range of LBAs. The unmap operation is performed when file blocks are freed, which occurs mainly when the file is deleted, but may also be performed for a selective freeing of part of the blocks of the file, as occurs in file trimming, downsizing or punching (deleting blocks from the middle of the file) operations.

According to embodiments of the invention, free space management, e.g. bitmaps management for the use of filesystems are handled by block control layer 103 instead of being traditionally handled by the filesystem. The filesystem can use a get-free-space-map service 162, provided by mapping controller 125 and facilitated by mapping data-structure 115.

Figure 2:
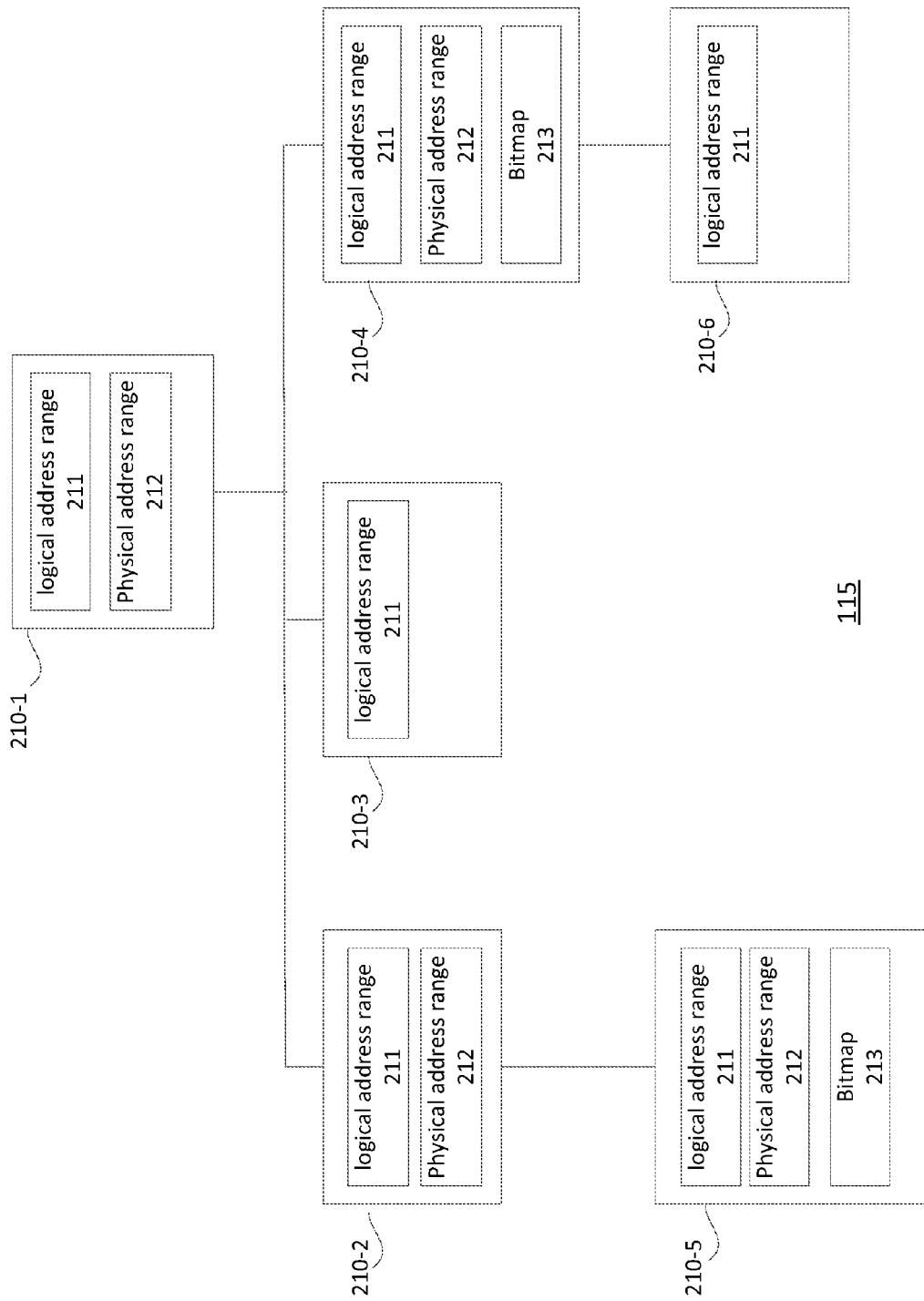
FIG. 2 is a schematic diagram of a mapping data structure, according to embodiments of the presently disclosed subject matter.

FIG. 2 illustrates mapping data-structure 115 implemented as a tree with multiple mapping entries 210. Each mapping entry 210 includes at least a logical address range 211 that is covered by the mapping entry. The multiple mapping entries cover the entire logical address space, or at least, the allocated areas thereof. Logical address range 211 is a consecutive address range in the logical address space and is served for searching the mapping data-structure for specific LBAs.

The logical address range represented by each mapping entry includes at least one data portion, also referred to hereinafter as an "allocation unit". Allocation units are typically of equal size throughout the system and larger than a size of a disk block (by way of non-limiting example, the size of a data portion can be 64 Kbytes, or in other words, 128 disk blocks of 512 bytes). The allocation unit is the smallest unit used for writing in the physical storage space and thus defines the smallest range covered by one mapping entry. One mapping entry may include address range that corresponds to one or multiple allocation units (e.g. 64 KB or n×64 KB).

Logical address range 211 includes at least a start address (e.g. a start LBA or a start address of an allocation unit) of the logical address range and an indication of the size of the range. The indication of the size may be a field that specifies the size (in blocks or allocation units) or may be expressed in an implicit manner, for example: the level in the tree may be indicative of the size of the range, for example: entries at the bottom level of the tree, such as entries 210-5, 210-6, may cover a range of 64 KB (one allocation unit); entries at the next upper level, such as entries 210-2-210-4, cover a range of 128 KB (two allocation units); and the entries at the upper level cover a range of 256 KB (three allocation units).

Entries that represent allocated ranges includes a physical address range 212 that is associated with the respective logical address range 211, see for example, entries 210-1, 210-2, 210-4 and 210-5. Entries that represent unallocated ranges, such as entries 210-3 and 210-6, do not include physical address range 212 (or set the physical address range 212 to null). According to another embodiment, there are no entries for unallocated ranges (i.e. entries 210-3 and 210-6 do not exist) and the absence of these logical ranges indicates that these ranges are free for allocation.

The mapping data-structure is looked up using a logical address(es) as a search key and the value retrieved from an entry that corresponds to the search key, is the physical address range 212 (or part thereof), associated with the searched logical address(es). The mapping data-structure can also be traversed by the order of the keys (logical address ranges 211) for scanning consecutive addresses within the logical address space.

A mapping entry may include a partially allocated logical address range. In order to identify which blocks within the logical address range 211 of the entry are actually allocated and which blocks of the range are free, the entry can include a bitmap 213 that covers the logical address range indicated in the entry. Bitmap 213 includes a bit for each of the logical blocks included in the entry's logical address range.

A mapping entry that does not include allocated space, i.e. an entry that points to null physical address range, need not storing a bitmap segment, although, it may be considered as having an all-zero bitmap ('000 . . . 0'), wherein a reset bit represent a free block. Thus, unlike the traditional approach of file systems that manages a bitmap that covers the whole volume, storing bitmaps within the mapping data-structure, implies that only occupied logical address ranges may be covered by a bitmap. Furthermore, not all the occupied ranges need to be covered by a bitmap, as described below.

Files may have smaller size than the allocation unit (of e.g. 64 KB) used by mapping data-structure 115 or may have larger size. Small files, i.e. files that are smaller than one allocation unit do not cover the entire logical address range of one entry. Small files may be grouped in one mapping entry of a size of one allocation unit and may cause holes of unallocated areas within the allocation unit, upon file deletion. So that only mapping entries that hold an address range of one allocation unit that is not fully occupied, may need to store a bitmap, as they are associated with small files allocation. Entries that include a full allocation unit or multiple full allocation units can be considered as completely full and do not require handling a bitmap or can be considered as having an all-ones bitmap ('111 . . . 1'), wherein a set bit represent an allocated block. Such entries are probably associated with large files, so as long as the file exists, de-allocations that cause holes in the entry, are not very common.

Although de-allocations of part of full entries are not common, there are filesystems (e.g. XFS and OCFS2) that have the ability to "punch a hole" in a file, i.e. a portion of the file can be marked as unwanted and the associated space should be de-allocated. So, in this case, a de-allocation can be requested to a part of a full entry that may not include a bitmap (since bitmaps are not required for full entries). So, only upon receiving a de-allocation request for part of a full entry, a bitmap segment is created, wherein all the bits are set to indicate allocated space, except for bits related to blocks in the de-allocated area, which should be reset. The hole that is punched in the address range of the mapping entry, split the address range into two or three segments: if the hole is in the middle of the range, then the first segment is of a first allocated range, the second segment is a non-allocated range and the third segment is a second allocated range. If the hole in punched at the edge of the range, then one segment will be of allocated space and the other is of non-allocated space. If each of the segments, or at least the allocated segments, has a minimal size of one allocation unit, it is possible to split the entry into two or three mapping entries (each of the new entries is either allocated or non-allocated), rather than creating a bitmap.

Mapping data-structure 115 is fully cached in cache memory 130, as the storage system can be redundant and the mapping data-structure can be backed-up in a secondary server rather than storing any change to a non-volatile storage.

Using the mapping data-structure as a data structure that selectively stores portions of bitmaps, that cover only part of the volume range, eliminates the need to manage large bitmaps that are complicated to handle. Furthermore, since the mapping data-structure is memory resident there is no overhead of I/O operations required for handling bitmaps.

FIG. 3 illustrates a method 300 for providing free space mapping services, by storage system 120, to an upper layer application, e.g. a filesystem. The mapping services are related to a logical volume whose content is managed by the upper layer application. The steps of method 300 may be executed by block control layer 103.

Method 300 includes step 310 of receiving, from an upper layer application, a request for obtaining a space allocation descriptor. The request may specify a range of logical addresses requested for mapping free areas or alternatively, the request may include a requested amount of free space to be obtained, for example, the amount of free space may include the number of free blocks requested or the number of any other free allocation units. In the latter case wherein the request includes amount of free space to be obtained, the response to the request may include the range of logical addresses (e.g. start address and end address) that includes at least the amount of free space requested. Note that since the free allocation units in this range need not be continuous, the range may cover more allocation units than the free allocation units to be obtained, as some of the allocation units within the range may be allocated. In either case, the range is included within a logical address space associated with the upper layer application. The space allocation descriptor to be provided includes data indicative of one or more logical blocks free for allocation within the range of logical addresses. The range of logical addresses may be a portion of the logical address space or may cover the entire logical address space. The upper layer application may decide that only a portion of the logical volume is destined for new allocations and this portion is used as the range of logical addresses requested for mapping. When this portion is fully or almost fully allocated another portion of the volume is selected for new allocations.

Step 310 is followed by a step 320 of providing the space allocation descriptor by using a data structure that is included in the block control layer and managed by the block control layer. The data structure is operative to map between the logical address space and allocated storage blocks within the physical storage space, managed by the block control layer.

The space allocation descriptor may be for example an allocation bitmap, including a bit for each block included in the range of logical addresses, wherein each bit in the bitmap represents whether or not the respective block is free. Alternatively, the space allocation descriptor may be an extent list, wherein each entry in the extent list includes a start block address and size counted in consecutive blocks within the extent and an allocation status for the entire blocks in the extent (i.e. allocated or not) or alternatively, the entries in the extent list may only correspond to free block extents, wherein each entry is indicative of consecutive free blocks.

The data structure may be mapping data-structure 115. FIG. 4 illustrates a sequence of additional steps 410-430, related to configuring the data structure and can be implemented as part of method 300.

Step 410 includes configuring the data structure to include a plurality of entries, each entry indicative of a mapping between: logical blocks, represented by the entry and included in the logical address space; and respective allocated storage blocks. The logical blocks mapped by the entry preferably correspond to a range of consecutive logical block addresses, so as to facilitate searching a specific logical address in the data structure.

The logical blocks represented by each entry are organized in one or more allocation units of a predefined size. The predefined size is the smallest size of data portions handled by the block control layer and by the data structure.

The entry can be either fully allocated, (i.e. each logical block in the entry is associated with an allocated physical block) or partially allocated (only part of the blocks are allocated). Optionally, there can be entries representing free ranges, wherein all the blocks are free, or alternatively, ranges of free blocks are not represented in the data structure.

Step 420 includes associating at least one entry with an allocation value, wherein the at least one entry is characterized by an identical allocation status of all logical blocks corresponding to the entry, the allocation value is indicative of the identical allocation status shared by all logical blocks of the at least one entry. For example, if all the logical blocks represented by a certain entry are allocated, then the allocation value associated with the entry is considered as an 'allocated status' and each logical block in the entry is considered as allocated. Otherwise, if all the logical blocks represented by a certain entry are free, then the allocation value associated with the entry is considered as a 'free status' and each logical block in the entry is considered as free. The allocation value can also be determined from the physical address range indicated in the entry. If physical address range 212 of the entry is set to null, the entry can be considered as being associated with an allocation value of 'free status', otherwise, if physical address range 212 is set to a real reference, then the entry can be considered as being associated with an allocation value of 'allocated-status'.

Step 430 includes configuring the data structure to include one or more bitmaps, each associated with a respective entry (a partially allocated entry) representing logical blocks having different allocation statuses, the bitmap is indicative of the allocation statuses of all the logical blocks in the respective entry. The bitmap includes one bit per each logical block represented by the entry for indicating the allocation status of the block. For example, if a logical block is allocated, its respective bit is set, while if the logical block is free, its respective bit is reset.

The data structure is handled in a cache memory included in the block control layer, so that there is no need to access the physical storage space for retrieving portions of the data structure. The data structure is redundant, as at least two servers included in control layer 103 host the data structure, so that even upon one server failure, an up-to-date copy of the data structure can be retrieved from another server. The data structure can be backed up to a persistent memory, as part of a background process, but there is no need to write any change made on the data structure to the persistent memory, in real-time.

Referring back to FIG. 3, Step 320 of providing the space allocation descriptor can include a step 321 of identifying in the data structure all entries indicative of mapping at least one logical address within the range of logical addresses. This step can include scanning the range of logical addresses that was specified in the request. Alternatively, if the request includes the amount of free space required, then step 321 includes scanning a sequential area (in terms of logical addresses) in the data structure until the requested amount of free space is accumulated. The range of logical addresses is then determined according to the sequential area that was scanned until obtaining the required amount of free space.

For each identified entry, step 321 is followed by step 323 that includes obtaining an entry allocation descriptor indicative of allocation status of all logical blocks corresponding to the entry, wherein if a certain identified entry is characterized by an identical allocation status of all logical blocks corresponding to the entry, the entry allocation descriptor includes data indicative of the range of the at least one logical address and the allocation value indicative of an allocation status of the entire entry. For example: the entry allocation descriptor can include a data indicative of the range of logical addresses that include, for example, a start LBA and a number of successive blocks from that LBA and the entry allocation descriptor further includes the allocation value of 'allocated status' or 'free status' that is applicable for each LBA in the range. Alternatively, the entry allocation descriptor includes a bitmap that covers all the range of logical addresses, wherein the first bit represents the first LBA and the last bit represents the last LBA and all the bits are either set, e.g. for indicating an allocated status of all blocks, or all the bits are reset, e.g. for indicating a free status of all blocks.

If the certain identified entry represents logical blocks having different allocation statuses, the entry allocation descriptor is configured to include the bitmap included in the certain identified entry.

Step 323 is followed by step 325 that includes generating the space allocation descriptor using the entry allocation descriptors of the identified entries. If the required space allocation descriptor is an extent list, then—for each group of contiguous bits of the same type (set or zero) an extent entry is added to the extent list that contains the start LBA associated with the first bit in the group and the size of the extent, reflected by the amount of contiguous bits. If the contiguous bits are all set, the status of the extent entry is set to 'allocated status', otherwise the allocation status is 'free status'.

If an identified entry does not include a bitmap and the entry is of a fully allocated range—if an allocation bitmap is required, then an all-set bitmap is created and appended to the allocation bitmap. The all-set bitmap includes a set-bit ('1') to each block included in the logical address range of the entry. If an extent list is required, then one extent entry will be added to the list, that includes the logical address range (start address and size) of the entry allocation status with a status 'allocated'.

For each uncovered part of the range of logical addresses requested for mapping (i.e., each mapping entry within the range that refers to a null physical address, or if there is no mapping entry that covers the part of the space range), if an allocation bitmap is required, an all-zero bitmap is created and appended to the allocation bitmap. The all-zero bitmap includes a zero-bit ('0') to each block included in the uncovered address range. If an extent list is required, then one extent entry will be added to the extent list, that includes the start address and size of the uncovered address range and a status 'non-allocated'.

Method 300 may further include method steps illustrated in FIG. 5, related to mapping services.

Step 510 includes receiving an allocation request for allocating one or more free storage blocks and for associating the free storage blocks with a second range of logical addresses, included within the logical address space. The allocation request is triggered by a write request initiated by the upper layer application. The amount of storage blocks to be allocated is determined according to the writing size included in the write request.

Step 520 includes allocating the free storage blocks. The allocating of the free storage blocks is provided merely in a case when the allocation request is related to writing data, corresponding to the second range of logical addresses, to the physical storage space. If, for example, a size of a file is incremented without writing data (as can occur when executing the command Set Attribute of e.g. NFS with a requested size that is larger than the current size of the file), it is up to the filesystem to reserve the extra bytes in the logical volume, without needing to request an allocation of physical blocks.

Step 530 includes updating the data structure so as to include a mapping between the second range of logical addresses and the free storage blocks that have been allocated.

FIG. 6 includes a method 600 for de-allocation of ranges in the logical address space. Steps 610-630 may be included in method 300.

Method 600 includes step 610 that is triggered upon a de-allocation request related to all logical addresses in an entry. Step 610 includes setting the allocation value associated with the entry to indicate a free status of the entire entry.

Method 600 includes step 620 that is triggered upon a de-allocation request related to a part of logical addresses in a certain entry. Step 620 includes associating the certain entry with a bitmap and using the bitmap to indicate the allocation status of each of the logical addresses is the certain entry. This step takes place when the address range to be unmapped is only part of the logical address range of the mapping entry and the mapping entry does not yet include a bitmap segment. The bitmap includes a bit for each of the disk blocks included in the logical address range of the entry, i.e. the size of the bitmap, in bits, is the size of the logical address range divided by a block size. The bits that correspond to blocks included in the address range to be unmapped are reset, the rest of the bits in the bitmap segment are set to indicate allocated blocks. In case the address range to be unmapped is only part of the logical address range of the mapping entry and the mapping entry already includes a bitmap, only resetting of bits, that correspond to deleted blocks included in the address range, is performed in the existing bitmap. In case the address range to be unmapped covers the whole logical address range of the mapping entry, the physical address range indicated in the entry is removed, so that the logical address range refers to a null physical address and the bitmap, if exists, is deleted. There is no need to create a bitmap or to reset bits in a bitmap, in this case. Alternatively, the entire entry is deleted.

If the address range indicated in the unmap request covers a wider range than the logical address range of the entry, then steps 610 and/or 620 are repeated for other entries that are involved in the address range to be unmapped.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method of operating a storage system comprising a block control layer operatively coupled to one or more physical storage devices constituting a physical storage space represented by storage blocks, the method comprising:
   receiving, by the block control layer and from an upper layer application, a request for obtaining a space allocation descriptor indicative of one or more logical blocks free for allocation within a range of logical addresses, wherein said range of logical addresses is comprised within a logical address space associated with the upper layer application; and scanning, by the block control layer, a data structure comprised in the block control layer and comprises mappings between logical addresses within said logical address space and allocated storage blocks within the physical storage space, wherein the scanning is for identifying mappings related to logical addresses within said range of logical addresses;

in accordance with identified mappings or non-found mappings, generating the space allocation descriptor as comprising data indicative of logical addresses that have no mapping to allocated storage blocks; and providing, by the block control layer, the space allocation descriptor to the upper layer application.

2. The method of claim 1 further comprising:
receiving an allocation request for allocating one or more free storage blocks and for associating the free storage blocks with a second range of logical addresses, comprised within said logical address space;
allocating the free storage blocks; and
updating said data structure so as to comprise a mapping between the second range of logical addresses and the free storage blocks that have been allocated.

3. The method of claim 2, wherein allocating the free storage blocks is provided in a case when the allocation request is related to writing data corresponding to the second range of logical addresses, to the physical storage space.

4. The method of claim 1 further comprising configuring said data structure to comprise a plurality of entries, each entry indicative of mapping between logical blocks comprised in said logical address space and respective allocated storage blocks, and wherein each entry corresponds to a range of consecutive logical block addresses.

5. The method of claim 4 further comprising associating at least one entry with an allocation value, wherein the at least one entry is characterized by an identical allocation status of all logical blocks corresponding to the at least one entry, and wherein said allocation value indicative of the identical allocation status shared by all the logical blocks of the at least one entry.

6. The method of claim 5 further comprising, responsive to a de-allocation request related to all logical blocks represented by the at least one entry, setting the allocation value associated with the entry to indicate a free status of the entire entry.

7. The method of claim 4 further comprising configuring said data structure to comprise one or more bitmaps each associated with a respective entry representing logical blocks having different allocation statuses, said bitmap indicative of the different allocation statuses of all logical blocks represented by the respective entry.

8. The method of claim 4 further comprising, responsive to a de-allocation request related to a part of logical blocks in a certain entry, associating said certain entry with a bitmap and using said bitmap to indicate an allocation status of each logical block represented by said certain entry.

9. The method of claim 4 wherein the logical blocks represented by each entry are organized in one or more allocation units of a predefined size, and wherein said allocation units are the smallest data portions handled by the block control layer and by said data structure.

10. The method of claim 1 wherein the data structure is handled in a cache memory comprised in the block control layer and wherein said scanning comprises scanning the data structure in the cache memory.

11. The method of claim 1, wherein the upper layer application is selected from the group consisting of a filesystem and a database application.

12. A non-transitory computer readable storage medium, that stores program instructions that when executed by a processor of a storage system cause the processor to perform:
receiving, by a block control layer of the storage system and from an upper layer application, a request for obtaining a space allocation descriptor indicative of one or more logical blocks free for allocation within a range of logical addresses, wherein said range of logical addresses is comprised within a logical address space associated with the upper layer application; and scanning, by the block control layer, a data structure comprised in the block control layer and comprises mappings between logical addresses within said logical address space and allocated storage blocks within a physical storage space of the storage system, wherein the scanning is for identifying mappings related to logical addresses within said range of logical addresses;

in accordance with identified mappings or non-found mappings, generating the space allocation descriptor as indicative of logical addresses that have no mapping to allocated storage blocks; and providing, by the block control layer, the space allocation descriptor to the upper layer application.

13. A storage system comprising a block control layer operatively coupled to one or more physical storage devices constituting a physical storage space represented by storage blocks; wherein the block control layer is configured to:
receive, from an upper layer application, a request for obtaining a space allocation descriptor indicative of one or more logical blocks free for allocation within a range of logical addresses, wherein said range of logical addresses is comprised within a logical address space associated with the upper layer application;

scan a data structure comprised in the block control layer and comprises mappings between said logical address space and allocated storage blocks within the physical storage space, wherein the scan is for identifying mappings related to logical addresses within said range of logical addresses;

in accordance with identified mappings or non-found mappings, generate the space allocation descriptor as indicative of logical addresses that have no mapping to allocated storage blocks; and provide the space allocation descriptor to the upper layer application.

14. The storage system of claim 13, wherein the block control layer is configured to:
receive an allocation request for allocating one or more free storage blocks and for associating the free storage blocks with a second range of logical addresses, comprised within said logical address space;
allocate the free storage blocks; and
update said data structure so as to comprise a mapping between the second range of logical addresses and the free storage blocks that have been allocated.

15. The storage system of claim 14, wherein the block control layer is configured to associate at least one entry with an allocation value, wherein the at least one entry is characterized by an identical allocation status of all logical blocks corresponding to the at least one entry and wherein said allocation value indicative of the identical allocation status shared by all the logical blocks of the at least one entry.

16. The storage system of claim 14, wherein the block control layer is configured to configure said data structure to comprise one or more bitmaps each associated with a respective entry representing logical blocks having different allocation statuses, said bitmap indicative of the allocation statuses of all logical blocks represented by the respective entry.

17. The storage system of claim 13, wherein the block control layer is configured to configure said data structure to comprise a plurality of entries, each entry indicative of mapping between logical blocks comprised in said logical address space and respective allocated storage blocks, and wherein each entry corresponds to a range of consecutive logical block addresses.

18. The storage system of claim 17, wherein the block control layer is configured to receive, from the upper layer application, a de-allocation request related to all logical blocks represented by said at least one entry and to set the allocation value associated with the at least one entry to indicate a free status of the entire entry.

19. The storage system of claim 13, wherein the block control layer is configured to receive, from the upper layer application, a de-allocation request related to a part of logical blocks in a certain entry, and associate said certain entry with a bitmap and using said bitmap to indicate the allocation status of each of the logical blocks in said certain entry.

* * * * *